(12) United States Patent
Lastrina et al.

(10) Patent No.: US 10,358,940 B2
(45) Date of Patent: Jul. 23, 2019

(54) ELLIPTICAL SLOT WITH SHIELDING HOLES

(71) Applicant: United Technologies Corporation, Farmington, CT (US)

(72) Inventors: Michael Lastrina, Manchester, CT (US); Nicholas Waters Oren, Marlborough, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 194 days.

(21) Appl. No.: 15/632,890

(22) Filed: Jun. 26, 2017

(65) Prior Publication Data

US 2018/0371942 A1 Dec. 27, 2018

(51) Int. Cl.
  *F01D 5/08* (2006.01)
  *F01D 25/12* (2006.01)
  (Continued)

(52) U.S. Cl.
  CPC ............ *F01D 25/12* (2013.01); *F01D 5/085* (2013.01); *F16C 3/02* (2013.01); *F05D 2220/32* (2013.01); *F05D 2240/61* (2013.01); *F05D 2240/63* (2013.01); *F05D 2250/14* (2013.01); *F05D 2250/314* (2013.01); *F05D 2260/20* (2013.01);
  (Continued)

(58) Field of Classification Search
  CPC ........ F01D 5/085; F16C 3/02; F16C 2326/43; F16C 2360/23; F16C 37/00; F05D 2260/941; F05D 2260/60; F05D 2240/63; F05D 2250/314; F05D 2240/61
  See application file for complete search history.

(56) References Cited

U.S. PATENT DOCUMENTS 9,631,498 B2   4/2017  Yokoyama
2009/0293654 A1*  12/2009  Pintauro ............... F02B 37/183
                                                  74/63
(Continued)

FOREIGN PATENT DOCUMENTS

FR     2892148 A1    4/2007
GB     2266345 A    10/1993
WO  2015084450 A2    9/2014

OTHER PUBLICATIONS

European Search Report for Application No. 18168935.7-1006; Report dated Nov. 19, 2018; 9 pages.

*Primary Examiner* — Eldon T Brockman
(74) *Attorney, Agent, or Firm* — Cantor Colburn LLP

(57) ABSTRACT

A turbine shaft comprising: a tubular body having an outer surface and an inner surface opposite the outer surface, the inner surface defining a hollow chamber within the tubular body, wherein the tubular body includes a first longitudinal axis concentric to the tubular body; and one or more shielded elliptical orifices, at least one shielded elliptical orifice comprising: an elliptical orifice in the tubular body including a major axis extending from a first side to a second side of the elliptical orifice, wherein the major axis is oriented at an angle parallel with a torque field of the tubular body; a first shielding orifice in the tubular body having a first axis collinear to the major axis; and a second shielding orifice in the tubular body having a second axis collinear to the major axis, wherein the elliptical orifice is located in between the first and second shielding orifice.

20 Claims, 3 Drawing Sheets

Figure 1:
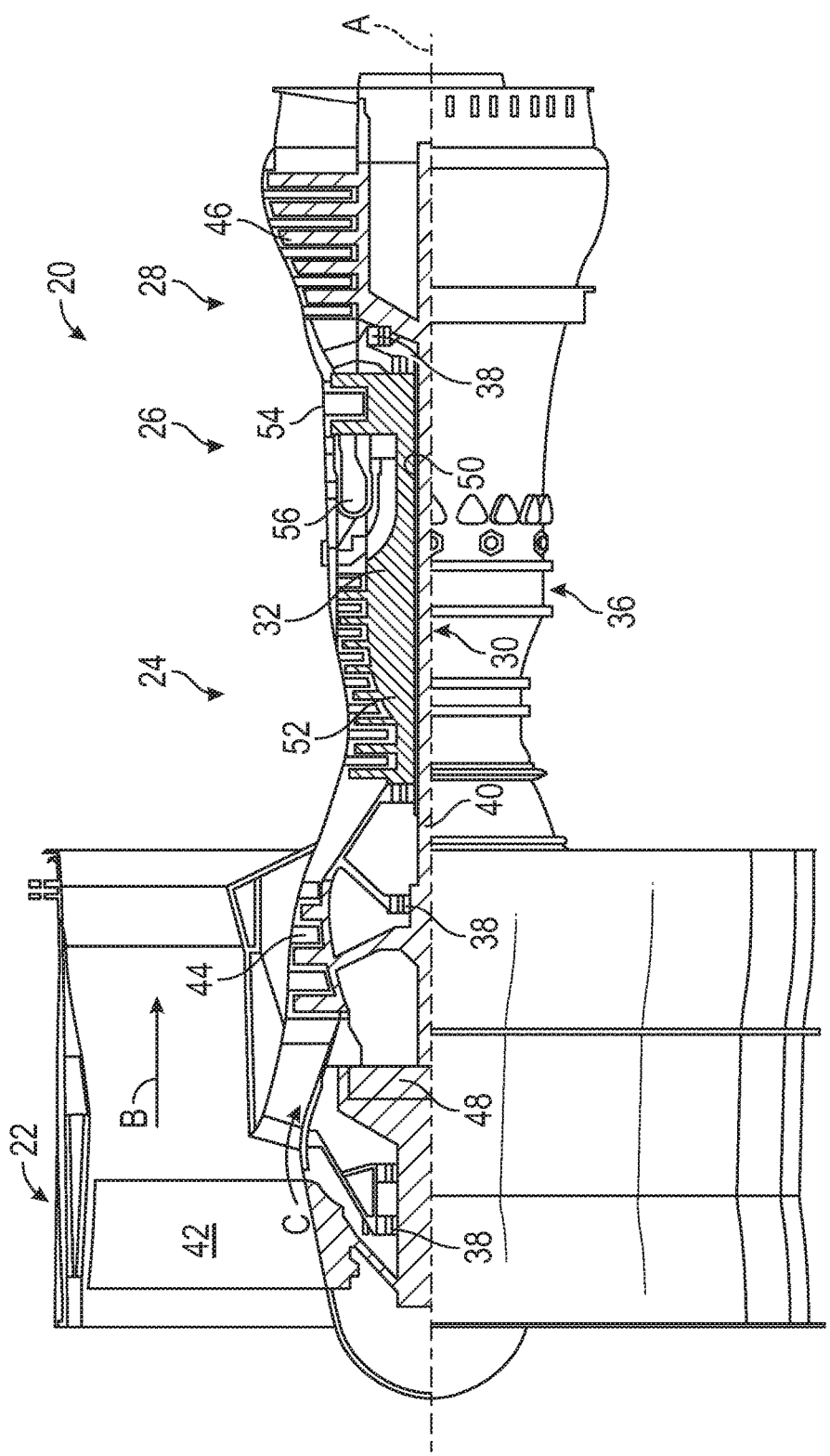

(51) Int. Cl.
*F16C 3/02* (2006.01)
*F16C 37/00* (2006.01)

(52) U.S. Cl.
CPC .... *F05D 2260/60* (2013.01); *F05D 2260/941* (2013.01); *F16C 37/00* (2013.01); *F16C 2326/43* (2013.01); *F16C 2360/23* (2013.01)

(56) References Cited

U.S. PATENT DOCUMENTS

2010/0283358 A1* 11/2010 Ganong .................... F16C 3/02
  310/75 D
2011/0048024 A1*  3/2011 Snyder ..................... F23R 3/06
  60/754
2016/0201511 A1   7/2016 Chang, Jr. et al.
2016/0341049 A1  11/2016 Neale et al.

* cited by examiner

ELLIPTICAL SLOT WITH SHIELDING HOLES

STATEMENT REGARDING FEDERALLY SPONSORED RESEARCH OR DEVELOPMENT

This invention was made with government support under Contract No. FA8626-16-C-2139 awarded by the United States Department of the Air Force. The government has certain rights in the invention.

BACKGROUND

The subject matter disclosed herein generally relates to gas turbine engines and, more particularly, to low pressure turbine shaft for gas turbine engines.

Gas turbine engines are increasingly being designed to be more compact overall, which makes designing in room from for secondary airflow systems to cool components increasingly difficult. New methods for cooling sections of the gas turbine engine are greatly desired.

SUMMARY

According to one embodiment, a turbine shaft for use in a gas turbine engine is provided. The turbine shaft comprising: a tubular body having an outer surface and an inner surface opposite the outer surface, the inner surface defining a hollow chamber within the tubular body, wherein the tubular body includes a first longitudinal axis concentric to the tubular body; and one or more shielded elliptical orifices, at least one shielded elliptical orifice comprising: an elliptical orifice in the tubular body extending from the outer surface to the inner surface, the elliptical orifice includes a major axis extending from a first side of the elliptical orifice to a second side of the elliptical orifice, wherein the major axis is oriented at an angle parallel with a torque field of the tubular body; a first shielding orifice in the tubular body extending from the outer surface to the inner surface, the first shielding orifice having a first axis collinear to the major axis, wherein the first shielding orifice is located at first distance away from the first side; and a second shielding orifice in the tubular body extending from the outer surface to the inner surface, the second shielding orifice having a second axis collinear to the major axis, wherein the second shielding orifice is located at second distance away from the second side, wherein the elliptical orifice is located in between the first shielding orifice and the second shielding orifice.

In addition to one or more of the features described above, or as an alternative, further embodiments may include where the torque field is at an angle of about 45° away from a second longitudinal axis on the outer surface, the second longitudinal axis being parallel to the first longitudinal axis.

In addition to one or more of the features described above, or as an alternative, further embodiments may include where the first shielding orifice is circular in shape.

In addition to one or more of the features described above, or as an alternative, further embodiments may include where second shielding orifice is circular in shape.

In addition to one or more of the features described above, or as an alternative, further embodiments may include where the first distance is about equal to the second distance.

In addition to one or more of the features described above, or as an alternative, further embodiments may include where the one or more shielded elliptical orifices are organized circumferentially the tubular body.

In addition to one or more of the features described above, or as an alternative, further embodiments may include where the one or more shielded elliptical orifices include a first group having one or more shielded elliptical offices organized circumferentially around the tubular body at a first position and a second group having one or more shielded elliptical orifices organized circumferentially around the tubular body at a second position a selected distance away from the first position.

In addition to one or more of the features described above, or as an alternative, further embodiments may include where the torque field is generated by torque being transferred from a turbine section to a compressor section through the turbine shaft along a second longitudinal axis when the turbine shaft is in operation in the gas turbine engine, the second longitudinal axis being on the outer surface and parallel to the first longitudinal axis.

According to another embodiment, an air transfer system for use in a gas turbine engine is provided. The air transfer system comprising: a compressor section; a turbine section; the turbine shaft fluidly connecting the turbine section to the compressor section, the turbine shaft comprising: a tubular body having an outer surface and an inner surface opposite the outer surface, the inner surface defining a hollow chamber within the tubular body, wherein the tubular body includes a first longitudinal axis concentric to the tubular body; and one or more shielded elliptical orifices, at least one shielded elliptical orifice comprising: an elliptical orifice in the tubular body extending from the outer surface to the inner surface, the elliptical orifice includes a major axis extending from a first side of the elliptical orifice to a second side of the elliptical orifice, wherein the major axis is oriented at an angle parallel with a torque field of the tubular body; a first shielding orifice in the tubular body extending from the outer surface to the inner surface, the first shielding orifice having a first axis collinear to the major axis, wherein the first shielding orifice is located at first distance away from the first side; and a second shielding orifice in the tubular body extending from the outer surface to the inner surface, the second shielding orifice having a second axis collinear to the major axis, wherein the second shielding orifice is located at second distance away from the second side, wherein the elliptical orifice is located in between the first shielding orifice and the second shielding orifice.

In addition to one or more of the features described above, or as an alternative, further embodiments may include where the turbine shaft mechanically connects the compressor section to the turbine section.

In addition to one or more of the features described above, or as an alternative, further embodiments may include where the torque field is at an angle of about 45° away from a second longitudinal axis on the outer surface, the second longitudinal axis being parallel to the first longitudinal axis.

In addition to one or more of the features described above, or as an alternative, further embodiments may include where the first shielding orifice is circular in shape.

In addition to one or more of the features described above, or as an alternative, further embodiments may include where the second shielding orifice is circular in shape.

In addition to one or more of the features described above, or as an alternative, further embodiments may include where the first distance is about equal to the second distance.

In addition to one or more of the features described above, or as an alternative, further embodiments may include where the one or more shielded elliptical orifices are organized circumferentially the tubular body.

In addition to one or more of the features described above, or as an alternative, further embodiments may include where the one or more shielded elliptical orifices include a first group having one or more shielded elliptical offices organized circumferentially around the tubular body at a first position and a second group having one or more shielded elliptical orifices organized circumferentially around the tubular body at a second position a selected distance away from the first position.

In addition to one or more of the features described above, or as an alternative, further embodiments may include where the first group of one or more shielded elliptical orifices fluidly connect the compressor section to the tubular body and the second group of one or more shielded elliptical orifices fluidly connect the tubular body to the turbine section.

In addition to one or more of the features described above, or as an alternative, further embodiments may include where the first group of one or more shielded elliptical orifices is fluidly connected to the second group of one or more shielded elliptical orifices through the hollow chamber.

In addition to one or more of the features described above, or as an alternative, further embodiments may include where the turbine section is a low pressure turbine and the compressor section is a low pressure compressor.

In addition to one or more of the features described above, or as an alternative, further embodiments may include where the torque field is generated by torque being transferred from the turbine section to the compressor section through the turbine shaft along a second longitudinal axis when the turbine shaft is in operation in the gas turbine engine, the second longitudinal axis being on the outer surface and parallel to the first longitudinal axis.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
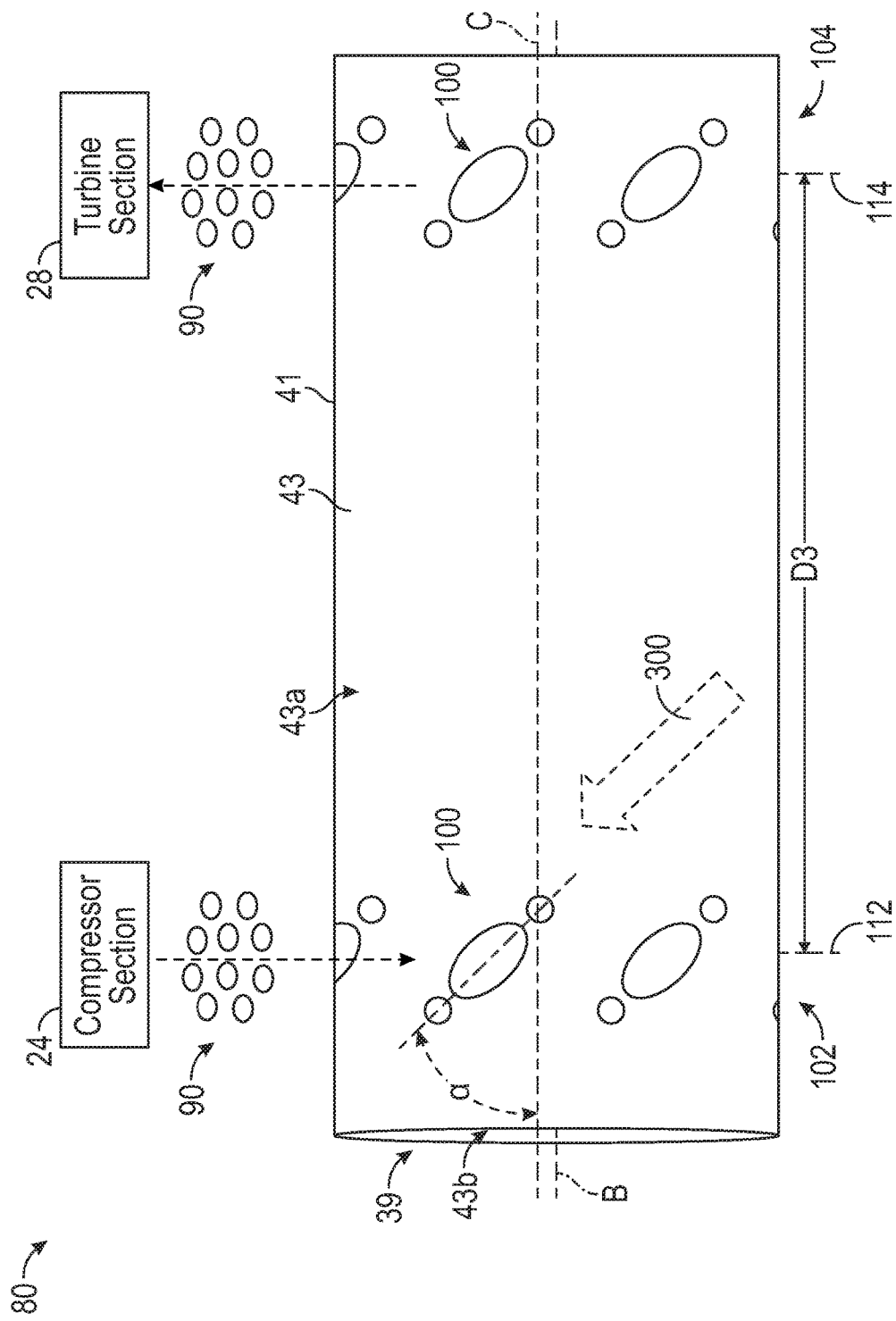
Figure 3:
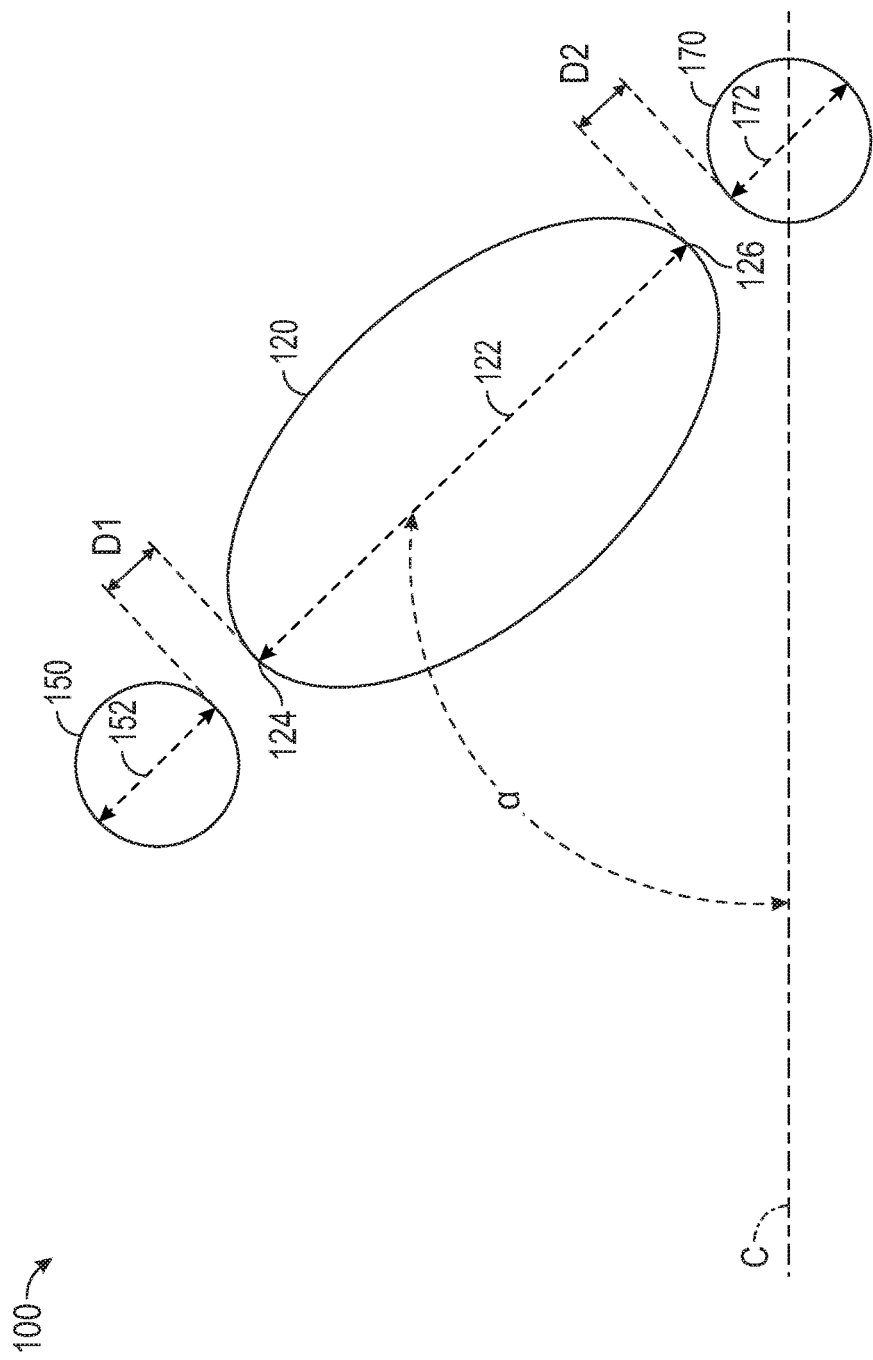

The following descriptions should not be considered limiting in any way. With reference to the accompanying drawings, like elements are numbered alike:

FIG. 1 is a cross-sectional illustration of an aircraft engine, in accordance with an embodiment of the disclosure FIG. 2 is a schematic illustration of a section of an air transfer system for use in a gas turbine engine, in accordance with an embodiment of the disclosure; and FIG. 3 is a schematic illustration of a shielded elliptical orifice for use in an air transfer system, in accordance with an embodiment of the disclosure.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air 90 along a bypass flow path B in a bypass duct, while the compressor section 24 drives air 90 along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]0.5. The "Low corrected fan tip speed" as disclosed herein according to one non-limiting embodiment is less than about 1150 ft/second (350.5 m/sec).

Referring now to FIGS. 2 and 3. FIG. 2 shows an air transfer system 80 for use in a gas turbine engine 20. The air transfer system 80 includes a compressor section 24, a turbine section 28, and a turbine shaft 41 fluidly connecting the turbine section 28 to the compressor section 24. In an embodiment, the turbine section 28 is a low pressure turbine 46. In another embodiment, the compressor section 24 is a low pressure compressor 44. In another embodiment, the turbine shaft 41 is an inner shaft 40 that mechanically connects the low pressure turbine 46 to the low pressure compressor 44. The turbine shaft 41 comprises a tubular body 43 having an outer surface 42a and an inner surface 43b opposite the outer surface 43a. The inner surface defines a hollow chamber 39 within the tubular body 43. The tubular body 43 includes a first longitudinal axis B concentric to the tubular body 43.

The tubular body 43 also includes one or more shielded elliptical orifices 100. As seen in FIG. 3, each shielded elliptical orifice 100 comprises an elliptical orifice 120 in the tubular body 43 extending from the outer surface 43a to the inner surface 43b, a first shielding orifice 150 in the tubular body 43 extending from the outer surface 43a to the inner surface 43b, and a second shielding orifice 170 in the tubular body 43 extending from the outer surface 43a to the inner surface 43b. The elliptical orifice 120 includes a major axis 122 extending from a first side 124 of the elliptical orifice 120 to a second side 124 of the elliptical orifice 120. The major axis 122 is oriented at an angle α parallel with a torque field 300 of the tubular body 43. The torque field 300 is generated by torque being transferred from the turbine section 28 to the compressor section 24 through the turbine shaft 41 along a second longitudinal axis C. The first shielding orifice 150 has a first axis 152 collinear to the major axis 122, as seen in FIG. 3. The first shielding orifice 150 is located at first distance D1 away from the first side 124. In an embodiment, the first shielding orifice 150 is circular in shape. The second shielding orifice 170 has a second axis 172 collinear to the major axis 122, as seen in FIG. 3. The second shielding orifice 170 is located at second distance D2 away from the second side 126. In an embodiment, the first distance D1 is about equal to the second distance D2. In another embodiment, the second shielding orifice 170 is circular in shape. As seen in FIG. 3, the elliptical orifice 120 is located in between the first shielding orifice 150 and the second shielding orifice 170. In an embodiment, the torque field 300 is at an angle α of about 45° away from the second longitudinal axis C on the outer surface 43a. The second longitudinal axis C being parallel to the first longitudinal axis B.

As seen in FIG. 2, the one or more shielded elliptical orifices 100 may be organized circumferentially around the tubular body 43. Each shielded elliptical orifice 100 may be equally space from each other. In an embodiment, the one or more shielded elliptical orifices 100 include a first group 102 having one or more shielded elliptical offices 100 organized circumferentially around the tubular body 43 at a first position 112 and a second group 104 having one or more shielded elliptical orifices 100 organized circumferentially around the tubular body 43 at a second position 114 a selected distance D3 away from the first position 112. The first group 102 of one or more shielded elliptical orifices 100 fluidly connect the compressor section 24 to the tubular body 43 and the second group 104 of one or more shielded elliptical orifices 100 fluidly connect the tubular body 43 to the turbine section 28. The first group 102 of one or more shielded elliptical orifices 100 is fluidly connected to the second group 104 of one or more shielded elliptical orifices 100 through the hollow chamber 39. Cooling air 90 is bled of the compressor section 24 and transported through the hollow chamber 39 to the turbine section 28. In the illustrated embodiment, the one or more shielded elliptical orifices 100 are being utilized for transportation of air 90 however they may also be used for other purposes including but not limited to oil drain and instrumentation egress.

As engines become more compact and secondary airflow systems become more complex, it is necessary to be able to pass air 90 through rotating, torque carrying, components. Advantageously, using elliptical orifices angled with the torque field help reduces stress concentrations in the turbine shaft while providing fluid connections for air flow. Further advantageously, the shielded holes on each side of the elliptical orifice help prevent compressive stress build up at each end of the ellipse, allowing for more stress reductions.

Technical effects of embodiments of the present disclosure include utilizing shielded elliptical orifices angled with a torque field in a turbine shaft to transfer air from a compressor to a turbine through the turbine shaft.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine shaft for use in a gas turbine engine, the turbine shaft comprising:
    a tubular body having an outer surface and an inner surface opposite the outer surface, the inner surface defining a hollow chamber within the tubular body, wherein the tubular body includes a first longitudinal axis concentric to the tubular body; and
    one or more shielded elliptical orifices, at least one shielded elliptical orifice comprising:
        an elliptical orifice in the tubular body extending from the outer surface to the inner surface, the elliptical orifice includes a major axis extending from a first side of the elliptical orifice to a second side of the elliptical orifice, wherein the major axis is oriented at an angle parallel with a torque field of the tubular body;
        a first shielding orifice in the tubular body extending from the outer surface to the inner surface, the first shielding orifice having a first axis collinear to the major axis, wherein the first shielding orifice is located at first distance away from the first side; and
        a second shielding orifice in the tubular body extending from the outer surface to the inner surface, the second shielding orifice having a second axis collinear to the major axis, wherein the second shielding orifice is located at second distance away from the second side, wherein the elliptical orifice is located in between the first shielding orifice and the second shielding orifice.

2. The turbine shaft of claim 1, wherein the torque field is at an angle of about 45° away from a second longitudinal axis on the outer surface, the second longitudinal axis being parallel to the first longitudinal axis.

3. The turbine shaft of claim 1, wherein the first shielding orifice is circular in shape.

4. The turbine shaft of claim 3, wherein the second shielding orifice is circular in shape.

5. The turbine shaft of claim 1, wherein the first distance is about equal to the second distance.

6. The turbine shaft of claim 1, wherein the one or more shielded elliptical orifices are organized circumferentially the tubular body.

7. The turbine shaft of claim 1, wherein the one or more shielded elliptical orifices include a first group having one or more shielded elliptical offices organized circumferentially around the tubular body at a first position and a second group having one or more shielded elliptical orifices organized circumferentially around the tubular body at a second position a selected distance away from the first position.

8. The turbine shaft of claim 1, wherein the torque field is generated by torque being transferred from a turbine section to a compressor section through the turbine shaft along a second longitudinal axis when the turbine shaft is in operation in the gas turbine engine, the second longitudinal axis being on the outer surface and parallel to the first longitudinal axis.

9. An air transfer system for use in a gas turbine engine, the air transfer system comprising:
    a compressor section;
    a turbine section;
    the turbine shaft fluidly connecting the turbine section to the compressor section, the turbine shaft comprising:
        a tubular body having an outer surface and an inner surface opposite the outer surface, the inner surface defining a hollow chamber within the tubular body, wherein the tubular body includes a first longitudinal axis concentric to the tubular body; and
        one or more shielded elliptical orifices, at least one shielded elliptical orifice comprising:
            an elliptical orifice in the tubular body extending from the outer surface to the inner surface, the elliptical orifice includes a major axis extending from a first side of the elliptical orifice to a second side of the elliptical orifice, wherein the major axis is oriented at an angle parallel with a torque field of the tubular body;
            a first shielding orifice in the tubular body extending from the outer surface to the inner surface, the first shielding orifice having a first axis collinear to the major axis, wherein the first shielding orifice is located at first distance away from the first side; and
            a second shielding orifice in the tubular body extending from the outer surface to the inner surface, the second shielding orifice having a second axis collinear to the major axis, wherein the second shielding orifice is located at second distance away from the second side, wherein the elliptical orifice is located in between the first shielding orifice and the second shielding orifice.

10. The air transfer system of claim 9, wherein the turbine shaft mechanically connects the compressor section to the turbine section.

11. The air transfer system of claim 9, wherein the torque field is at an angle of about 45° away from a second longitudinal axis on the outer surface, the second longitudinal axis being parallel to the first longitudinal axis.

12. The air transfer system of claim 9, wherein the first shielding orifice is circular in shape.

13. The air transfer system of claim 12, wherein the second shielding orifice is circular in shape.

14. The air transfer system of claim 9, wherein the first distance is about equal to the second distance.

15. The air transfer system of claim 9, wherein the one or more shielded elliptical orifices are organized circumferentially the tubular body.

16. The air transfer system of claim 9, wherein the one or more shielded elliptical orifices include a first group having one or more shielded elliptical offices organized circumferentially around the tubular body at a first position and a second group having one or more shielded elliptical orifices organized circumferentially around the tubular body at a second position a selected distance away from the first position.

17. The air transfer system of claim 16, wherein the first group of one or more shielded elliptical orifices fluidly connect the compressor section to the tubular body and the second group of one or more shielded elliptical orifices fluidly connect the tubular body to the turbine section.

18. The air transfer system of claim 16, wherein the first group of one or more shielded elliptical orifices is fluidly connected to the second group of one or more shielded elliptical orifices through the hollow chamber.

19. The air transfer system of claim 9, wherein the turbine section is a low pressure turbine and the compressor section is a low pressure compressor.

20. The air transfer system of claim 9, wherein the torque field is generated by torque being transferred from the turbine section to the compressor section through the turbine shaft along a second longitudinal axis when the turbine shaft is in operation in the gas turbine engine, the second longitudinal axis being on the outer surface and parallel to the first longitudinal axis.

* * * * *